(12) United States Patent
Ko et al.

(10) Patent No.: US 8,594,042 B2
(45) Date of Patent: Nov. 26, 2013

(54) HANDOFF METHOD AND APPARATUS FOR TERMINAL BASED ON EFFICIENT SET MANAGEMENT IN COMMUNICATION SYSTEM

(75) Inventors: Min-Suk Ko, Suwon-si (KR); Hye-Jeong Kim, Suwon-si (KR); Seong-Woo Ahn, Suwon-si (KR)

(73) Assignee: Qualcomm Incorporated, San Diego, CA (US)

( * ) Notice: Subject to any disclaimer, the term of this patent is extended or adjusted under 35 U.S.C. 154(b) by 856 days.

(21) Appl. No.: 12/159,711

(22) PCT Filed: Jan. 12, 2007

(86) PCT No.: PCT/KR2007/000220
§ 371 (c)(1),
(2), (4) Date: Jun. 30, 2008

(87) PCT Pub. No.: WO2007/081174
PCT Pub. Date: Jul. 19, 2007

(65) Prior Publication Data
US 2008/0299979 A1 Dec. 4, 2008

(30) Foreign Application Priority Data

Jan. 12, 2006 (KR) .................. 10-2006-0003506
Jan. 11, 2007 (KR) .................. 10-2007-0003199

(51) Int. Cl.
*H04W 4/00* (2009.01)
*H04W 36/00* (2009.01)
*H04B 7/216* (2006.01)

(52) U.S. Cl.
USPC ..................................... 370/331

(58) Field of Classification Search
None
See application file for complete search history.

(56) References Cited

U.S. PATENT DOCUMENTS 6,173,181 B1 * 1/2001 Losh ........................ 455/434
6,195,551 B1 * 2/2001 Kim et al. ................. 455/436
6,542,743 B1 * 4/2003 Soliman ..................... 455/436

(Continued)

FOREIGN PATENT DOCUMENTS

KR 1020040041406 A 5/2004
KR 100578653 B1 5/2006

OTHER PUBLICATIONS

International Search Report and Written Opinion—PCT/KR2007/000220, International Search Authority—European Patent Office—May 3, 2007 (100577WO).

*Primary Examiner* — Chirag Shah
*Assistant Examiner* — Srinivasa Reddivalam
(74) *Attorney, Agent, or Firm* — Seyfarth Shaw LLP

(57) ABSTRACT

A handoff method and apparatus for a terminal based on efficient set management. A pilot search rate for base stations of a neighbor set is increased, thereby preventing a failure to perform a necessary idle handoff or a failure to receive a paging message for a call connection. A terminal checks if it is in an idle state or in a traffic state, and measures the pilot energy of the BS of the active set and the pilot energy of a BS of the neighbor set with different pilot measurement patterns according to the checked state. The terminal measures the pilot of the BS of the active set and the pilots of at least one BS of the neighbor set while in the idle state. The terminal in the idle state operates in a sleep mode upon reception of information indicating that there is no paging channel, thereby minimizing its power consumption.

29 Claims, 7 Drawing Sheets

(56) References Cited

U.S. PATENT DOCUMENTS

| | | |
|---|---|---|
| 6,556,834 B1 | 4/2003 | Kobayashi et al. |
| 6,647,261 B1 * | 11/2003 | Banerjee ................. 455/436 |
| 6,667,962 B1 * | 12/2003 | Lee et al. .................. 370/335 |
| 7,417,976 B2 * | 8/2008 | Sinnarajah et al. ......... 370/335 |
| 2002/0114288 A1 | 8/2002 | Soliman |
| 2004/0166865 A1 * | 8/2004 | Soong et al. .............. 455/450 |

* cited by examiner

HANDOFF METHOD AND APPARATUS FOR TERMINAL BASED ON EFFICIENT SET MANAGEMENT IN COMMUNICATION SYSTEM

PRIORITY

This application claims priority to an application filed in the Korean Industrial Property Office on Jan. 12, 2006, and assigned Ser. No. 3506/2006, an application filed in the Korean Industrial Property Office on Jan. 11, 2007, and assigned Ser. No. 3199/2007, and to PCT application PCT/KR2007/000220 filed on Jan. 12, 2007, the contents of each of which are incorporated herein by reference.

BACKGROUND OF THE INVENTION

1. Field of the Invention

The present invention relates to a handoff method and apparatus for a terminal based on efficient set management.

2. Description of the Related Art

In a mobile communication system, a terminal performs sleep processing to interrupt the operation of most of the hardware therein during a time other than its assigned paging slot, in order to reduce power consumption of its battery.

In an idle state in which a call connection is not made, i.e., traffic is not set up, the terminal repeats waking up only during its assigned paging slot to search the paging slot, and sleeps during the time other than the paging slot. The terminal does not operate in a sleep mode when receiving an overhead message, having a transmission message destined to a base station, or performing such an operation as an idle handoff.

To prevent excessive power consumption of a Central Processing Unit (CPU) due to unnecessary searches while guaranteeing a predetermined number of searches within a specific time, the terminal in the idle state also performs search rate control for controlling the time taken to search a single set and search scheduling for efficiently searching a single set within given time.

The terminal wakes up for a short time period of, for example, 50-80 ms, during the assigned paging slot. For that short time period, the terminal has to search for pilots of as many base stations of a neighbor set as possible to determine whether the terminal is in the idle handoff situation. Consequently, the terminal does not perform search rate control for that time period.

FIG. 1 illustrates a conventional process in which a terminal in an idle state performs pilot energy measurement during a pilot slot. As illustrated in FIG. 1, the terminal performs a search scheduling process to search for a pilot in a Base Stations (BS) of an active set and a pilot in a BS of a neighbor set, by turns, during every period, in which a BS of the active set will be referred to as A and a BS of the neighbor set will be referred to as N.

For example, when the number of pilots of a neighbor set is M, i.e., the number of BSs of the neighbor set is M, the terminal searches in the order of A, $N_1$, A, $N_2$, ..., A, $N_M$, A, $N_1$, A, $N_2$, ..., A, $N_M$ ... In other words, after measuring the pilot of A of the active set and then the pilot of $N_1$ of the neighbor set, the terminal measures the pilot of A and then the pilot of $N_2$. In this way, the terminal continues pilot measurement up to NM of the neighbor set.

The pilot measurement is performed by the terminal in the idle state during the paging slot.

FIG. 2 is a flowchart illustrating a conventional process in which the terminal in the idle state searches for the pilot of a BS of each set to determine whether to perform an idle handoff and performs the idle handoff according to the determination result.

In step 210, the terminal searches for pilots as illustrated in FIG. 1. More specifically, the terminal measures the pilot of A of the active set and the pilot of N of the neighbor set, in turns, one by one.

In step 220, the terminal determines if there is N in the neighbor set, which has pilot energy that is greater by at least −3 dB than that of A in the active set each time it searches for one pilot of the active set and one pilot of the neighbor set is finished. If such N does not exist in the neighbor set, the process returns to step 210 for pilot searching.

If such N exists in the neighbor set, in step 240, the terminal performs an idle handoff by setting the neighbor set as an active set and adding the previous active set to a neighbor set.

However, when the terminal is in a boundary of a cell or a sector, a change falling outside a threshold range of an idle handoff between adjacent BSs may occur frequently. Consequently, the terminal may frequently repeat an idle handoff between the adjacent BSs, failing to enter a power saving mode and thus increasing its power consumption.

To solve the problem, a handoff is conventionally permitted only after predetermined time $T_1$ has elapsed from the last idle handoff. More specifically, the terminal determines if a difference between the last handoff time and the current time is greater than the predetermined time $T_1$ in step 230. If so, the terminal performs an idle handoff by setting the neighbor set as an active set in step 240. If the difference is not greater than the predetermined time $T_1$ in step 230, the terminal searches for A of the active set and N of the neighbor set in step 210.

As described above, the terminal searches for a BS of the active set and a BS of the neighbor set, in turns, while in the idle state. However, during a paging slot search period to which search rate control is not applied, when searching the paging slot as illustrated in FIG. 2, the terminal may search the active set at an even higher rate than required in a Code Division Multiplexing Access (CDMA) system and the number of BSs of the neighbor set, which the terminal can search for, may be reduced accordingly. As a result, the terminal may not sufficiently recognize its surrounding network status within given time.

If the terminal fails to recognize a need for an idle handoff when the idle handoff is required, it would spend more time reacquiring a slot during a next paging slot, thereby increasing a system loss probability.

Moreover, the conventional method in which an idle handoff is permitted only after the predetermined time $T_1$ has elapsed from the last handoff using a timer for the purpose of preventing unnecessarily frequent handoffs at the cell boundary imposes a restriction on every idle handoff and thus may also interrupt a necessary idle handoff.

Additionally, a BS assigns a paging slot to each terminal and the terminal receives a paging channel message during its assigned paging slot. The paging channel message includes a paging message requesting the terminal to perform a call connection. However, conventionally, a handoff is requested regardless of whether the current slot is the paging slot assigned to the terminal. As a result, if the terminal performs an idle handoff during its assigned paging slot, it would likely to fail to receive the paging message. In particular, when performing an idle handoff at a boundary region in which a network IDentification (ID) or a zone ID changes, the terminal may fail to receive the paging message during registration in a BS, after the idle handoff.

SUMMARY OF THE INVENTION

The present invention has been designed to address at least the above problems and/or disadvantages, and to provide at least the advantages described below. Accordingly, an aspect of the present invention is to provide a handoff method and apparatus for a terminal based on efficient set management.

Another aspect of the present invention is to provide a method and apparatus in which a terminal determines whether to perform a handoff through pilot energy measurement using different pilot measurement patterns according to its connection states.

Another aspect of the present invention is to provide a method and apparatus in which a terminal manages a pilot set while in an idle state for a handoff.

Another aspect of the present invention is to provide an efficient handoff method and apparatus in which a terminal increases a pilot search rate of a BS of a neighbor set in order to prevent a failure to perform a necessary idle handoff or a failure to receive a paging message for a call connection.

In accordance with an aspect of the present invention, there is provided a handoff method for a terminal in an idle state in a mobile communication system. The handoff method includes searching for a pilot of a single base station of an active set and pilots of at least one base stations of a neighbor set, checking if among the base stations of the neighbor set, there is a base station having pilot energy that is greater than that of the active set, if there is such a base station in the neighbor set, checking if a pseudo noise offset of the base station of the neighbor set to which idle handoff is made is equal to that of a base station included in an active set list containing previous base stations that have been active sets, if those pseudo noise offsets are equal to each other, calculating a difference between the last time at which a previous base station functions as an active set prior to the current active set and the current time, and if the difference is greater than threshold time, checking if a pilot energy of the active set is less than a threshold and performing a handoff to the base station of the neighbor set.

In accordance with another aspect of the present invention, there is provided a handoff method for a terminal based on efficient set management. The handoff method includes, the terminal checking if a channel assignment message is received from a base station to check its connection state, and measuring a pilot energy of a single base station of an active set and pilot energies of at least one base stations of a neighbor set using different pilot measurement patterns according to the connection state.

In accordance with another aspect of the present invention, there is provided a terminal that performs a handoff based on efficient set management. The terminal includes a pilot energy extractor for measuring an energy of a received pilot channel, a storing unit for storing the measured pilot energy separately for an active set and a neighbor set, a comparator for reading pilot energies of the active set and the neighbor set from the storing unit and comparing the read pilot energies using different pilot measurement patterns according to a connection state of the terminal, and a handoff unit for determining whether to perform a handoff according to the comparison result.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF THE EXEMPLARY EMBODIMENT

Figure 1:
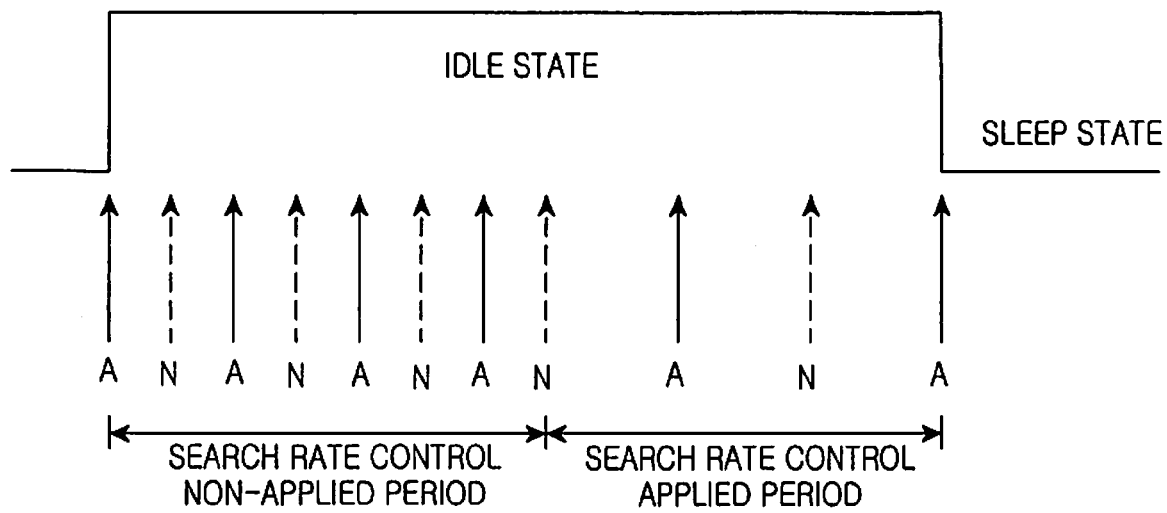
FIG. 1 illustrates a conventional process in which a terminal in an idle state performs pilot energy measurement.
Figure 2:
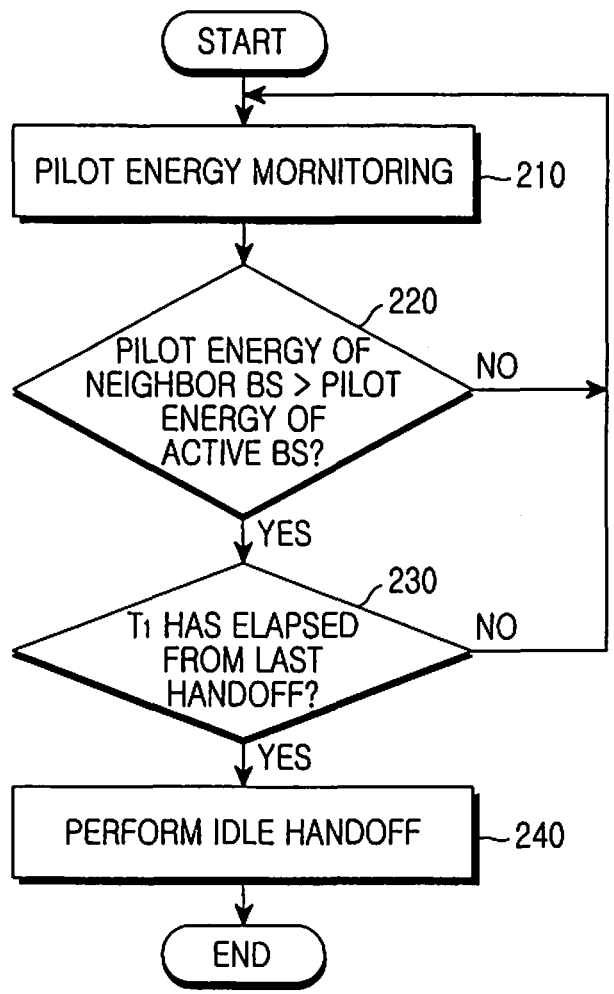
FIG. 2 is a flowchart illustrating a conventional process in which a terminal in an idle state searches for pilots and performs a handoff.

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness, and like reference numerals refer to like elements throughout the specification.

The present invention provides a method for reducing an active set search rate in a paging slot search period to which search rate control is not applied.

In a Code Division Multiplexing Access (CDMA) technique, a pilot set is a set of Base Stations (BSs) that satisfy a predetermined condition. The pilot set can be classified into an active set, a candidate set, a neighbor set, and a remaining set.

The active set is a set of BSs from which a terminal is receiving a sync channel or a paging channel, or has a call connection with. The candidate set is a set of BSs having a high probability of becoming the active set, with which the terminal has no call connection, but from which the terminal receives a sync channel or a paging channel at a similar energy level to the active set.

The neighbor set is a set of BSs surrounding the active set and having some probability of becoming a new active set through a handoff during movement of the terminal. The remaining set is a set of BSs that fail to satisfy the conditions of the other three sets.

While in an idle state, the terminal manages a single active set and BSs of a neighbor set which are informed through a neighbor list message transmitted from a BS that is the active set. In order to receive a paging channel from a BS having the best reception performance, the terminal continuously searches for pilots of the BS of the active set and the BSs of the neighbor set. When there is a BS satisfying a handoff condition in the neighbor set, the terminal performs an idle handoff by changing the BS of the neighbor set into an active set.

Therefore, the present invention provides a method in which a terminal checks if it is in an idle state or in a traffic state, and measures the pilot energy of the BS of the active set and the pilot energy of a BS of the neighbor set with different pilot measurement patterns according to the checked state. The present invention also provides a method in which the terminal measures the pilot of the single BS of the active set and the pilots of at least one BSs of the neighbor set while in the idle state. The present invention also provides a method in which the terminal in the idle state operates in a sleep mode upon reception of information indicating that there is no paging channel, thereby minimizing its power consumption.

Figure 3:
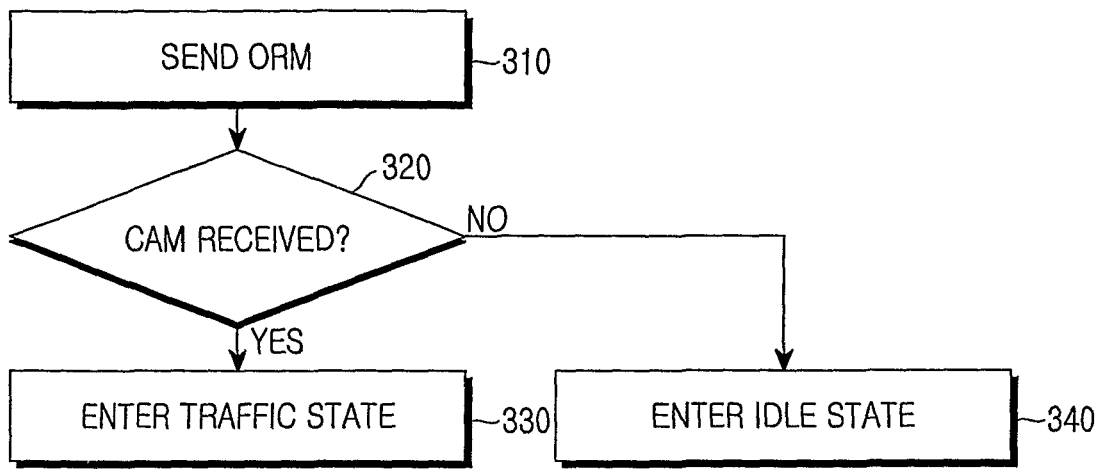
FIG. 3 is a flowchart illustrating a process in which a terminal sends a connection request to a BS in order to transit to a traffic state according to an exemplary embodiment of the present invention.
Figure 4:
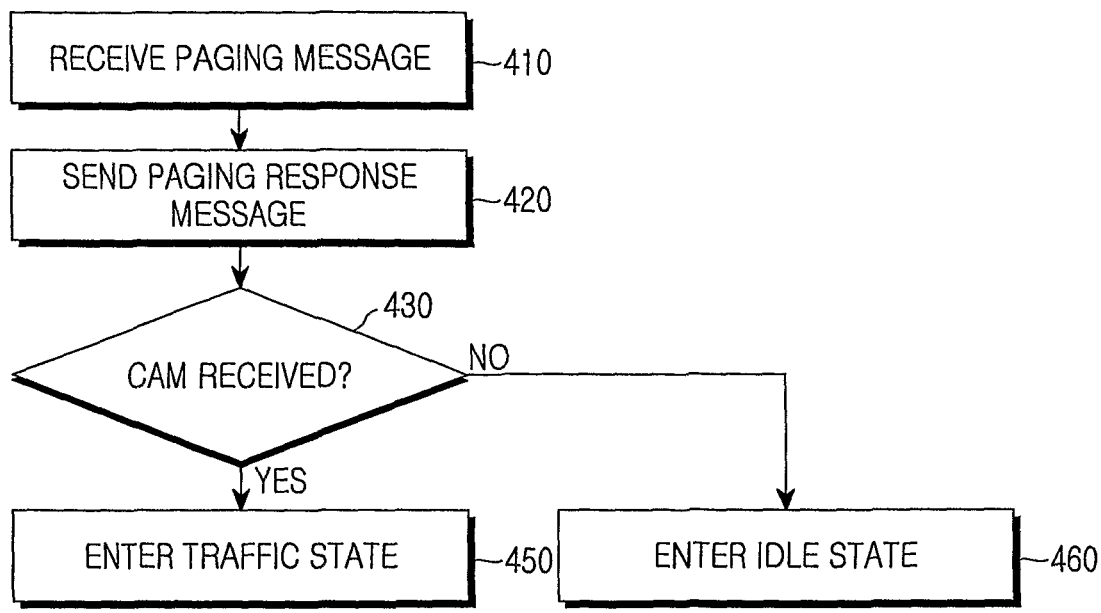
FIG. 4 is a flowchart illustrating a process in which a BS sends a connection request to a terminal, requesting the terminal to transit to a traffic state according to an exemplary embodiment of the present invention.

FIGS. 3 and 4 illustrate conditions that the terminal has to meet for entering the traffic state. In particular, FIG. 3 illustrates the traffic state entry conditions when the terminal sends a connection request to a BS.

Referring to FIG. 3, in step 310, the terminal sends an ORder Message (ORM) requesting a connection to a BS in order to perform a communication with the BS by connecting to radio resources. In step 320, the terminal determines if a Channel Assignment Message (CAM) is received in response to the ORM. If the CAM is received, in step 330, the terminal is in connection to the radio resources through a channel assigned by the BS, i.e., the terminal enters the traffic state.

If the terminal fails to receive the CAM from the BS in step 320, in step 340, the terminal remains in the idle state.

FIG. 4 illustrates the traffic state entry conditions when the BS sends a connection request to the terminal. Referring to FIG. 4, in step 410, the terminal receives a message requesting a connection to radio resources from the BS. For example, the terminal receives a paging message indicating that there is transmission data for the terminal from the BS. In step 420, the terminal sends a paging response message indicative of the normal reception of the paging message to the BS.

In step 430, the terminal determines if the CAM is received from the BS. If the CAM is received, in step 450, the terminal transits to the traffic state by connecting to the radio resources through a channel assigned by the BS. If the terminal fails to receive the CAM from the BS in step 430, in step 460, the terminal remains in the idle state.

According to the present invention, the terminal in the idle state periodically performs sleep processing. Thus, the terminal in the idle state can perform pilot energy measurement only while waking up. Such a wake-up period is much shorter than the time during which the terminal in the traffic state performs pilot energy measurement.

Moreover, while in the idle state, the terminal experiences a difficulty in recognizing the energy state of a neighbor set surrounding the terminal due to sleep processing. Therefore, the present invention provides a method for increasing the neighbor set search rate while reducing the active set search rate.

Figure 5:
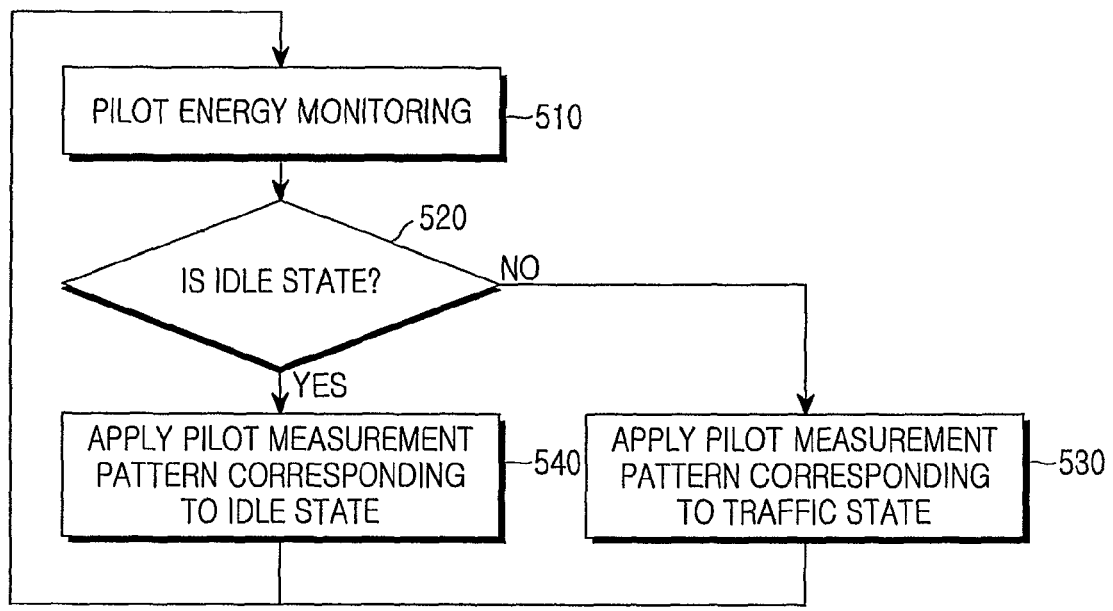
FIG. 5 is a flowchart illustrating a process of applying different pilot measurement patterns based on states of a terminal according to an exemplary embodiment of the present invention.

FIG. 5 is a flowchart illustrating a process of applying different pilot measurement patterns based on the state of the terminal according to an exemplary embodiment of the present invention.

Referring to FIG. 5, the terminal performs pilot energy measurement in step 510. In step 520, the terminal determines if its state determined as illustrated in FIG. 3 or 4 is the idle state.

If the terminal is in the idle state, in step 540, the terminal continues using a pilot measurement pattern corresponding to the idle state.

However, if the terminal is in the traffic state, in step 530, the terminal uses a pilot measurement pattern corresponding to the traffic state.

Thereafter, the terminal performs pilot energy measurement using the corresponding pilot measurement pattern in step 510.

Figure 6:
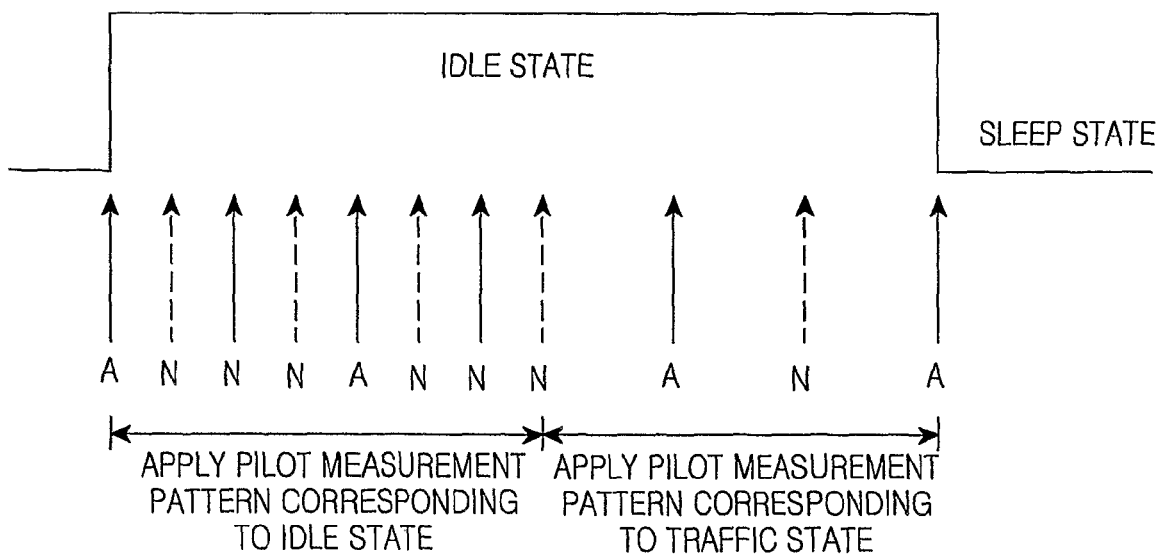
FIG. 6 is a view illustrating a process in which an idle-state terminal performs pilot energy measurement according to an exemplary embodiment of the present invention.

FIG. 6 is a view illustrating a process in which an idle-state terminal performs pilot energy measurement according to an exemplary embodiment of the present invention.

As illustrated in FIG. 6, in an exemplary embodiment of the present invention, the terminal searches for a single BS of an active set and at least one (=m) BSs of a neighbor set in the order of A, $N_1$, A, $N_2$, . . . , A, $N_m$, A, $N_1$, A, $N_2$, . . . , A, $N_m$ . . . during a search rate control non-applied period, thereby performing search scheduling. The terminal collectively processes the search results with respect to the single BS of the active set and the m BSs of the neighbor set. Consequently, it is possible to reduce the active set search rate and increase the neighbor set search rate, while reducing the time required for processing the search results.

For example, in an exemplary embodiment of the present invention, m is set to 3. In this case, the active set search rate is reduced to half and the neighbor set search rate is increased to 1.5 times. According to the present invention, m may be set variable according to a search rate. That is, m may be set to be greater than 3 in order for the terminal to wake up during a paging slot and search for BSs of the neighbor set with the maximum efficiency. By performing pilot measurement for the BSs of the neighbor set more times than for the single BS of the active set, the terminal can efficiently perform an idle handoff.

During a search rate applied period, the terminal performs pilot energy measurement for A of the active set and N of the neighbor set, by turns, for the reliability of the active set. More specifically, the terminal determines if among the BSs of the neighbor set, there is a BS having pilot energy that is greater by at least 3 dB than that of the BS of the active set by measuring a pilot of the active set and a pilot of the neighbor set.

Figure 7:
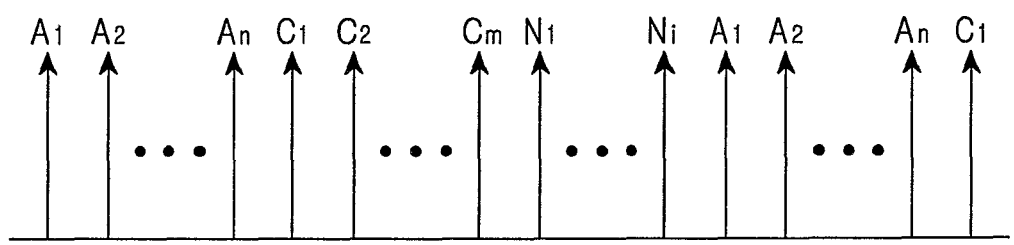
FIG. 7 is a view illustrating a process in which a traffic-state terminal performs pilot energy measurement according to an exemplary embodiment of the present invention.

FIG. 7 is a view illustrating a process in which a traffic-state terminal performs pilot energy measurement according to an exemplary embodiment of the present invention.

Referring to FIG. 7, in the traffic state, the terminal applies search rate control to every period. Thus, the terminal performs pilot energy measurement over the entire period of the traffic state with a pattern as illustrated in FIG. 7. More specifically, after the terminal searches its managed active sets, it searches in its managed candidate sets and then neighbor sets. For example, the terminal may search one through four neighbor sets.

Thus, as illustrated in FIG. 7, when a BS of the active set is referred to as A, a BS of the candidate set is referred to as C, a BS of the neighbor set is referred to as N, the number of active sets is N, the number of candidate sets is M, and the number of neighbor sets is I, the traffic-state terminal performs searches in the order of $A_1, A_2, \ldots, A_N, C_1, C_2, \ldots, C_M, N_1, N_2, \ldots, N_1, A_1, \ldots$.

Figure 8:
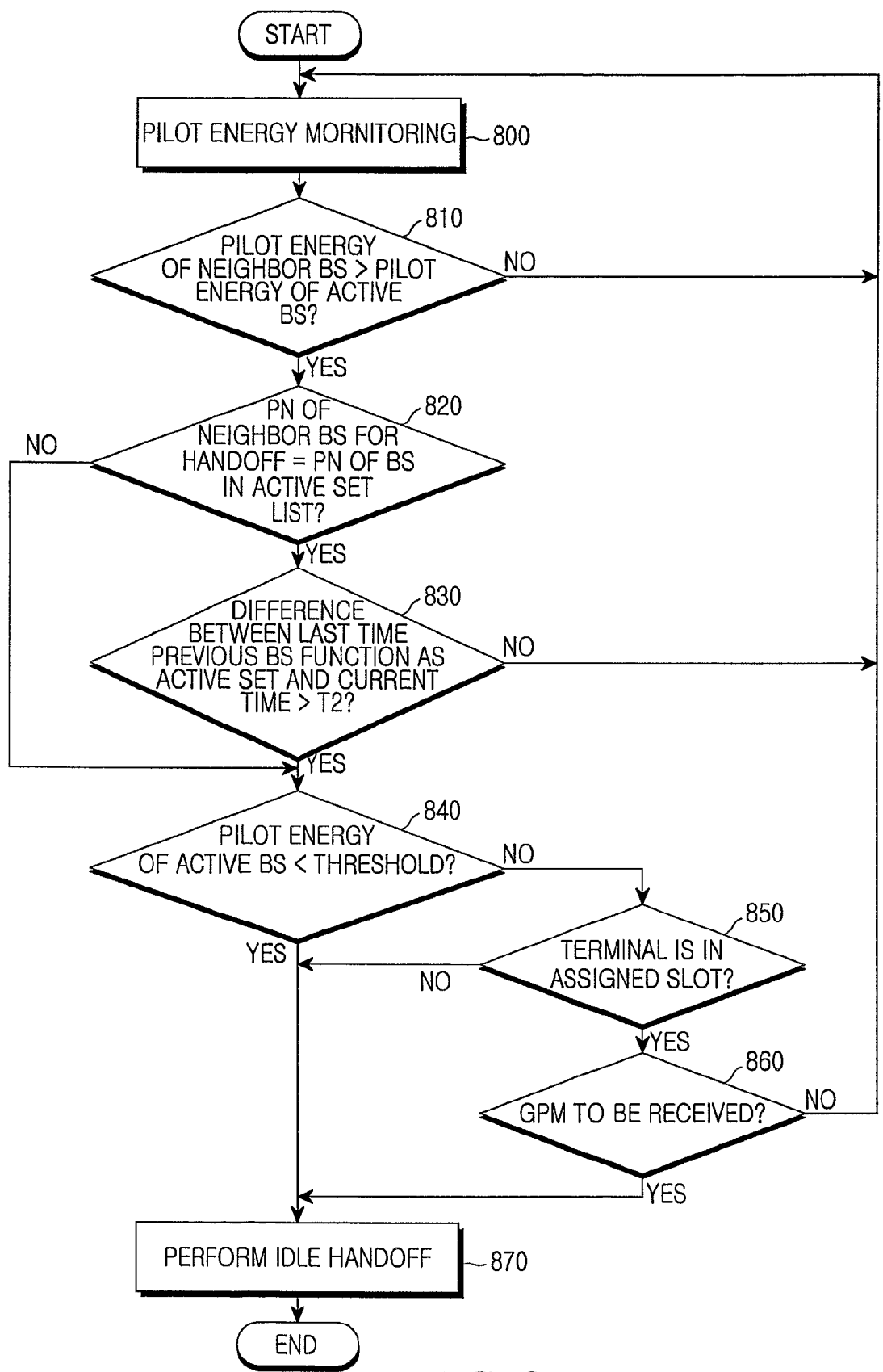
FIG. 8 is a flowchart illustrating a process in which a terminal according to an exemplary embodiment of the present invention performs an idle handoff.

FIG. 8 is a flowchart illustrating a process in which a terminal according to an exemplary embodiment the present invention performs an idle handoff.

Referring to FIG. 8, in step 800, the terminal performs pilot energy measurement for a single BS of an active set and at least one (=m) BSs of a neighbor set, as illustrated in FIG. 6.

In step 810, the terminal determines if, among the BSs of the neighbor set, there is a BS having pilot energy that is greater by at least 3 dB than that of the BS of the active set. If there is a BS having pilot energy that is greater by at least 3 dB than that of the BS of the active set, in step 820, a process begins for an idle handoff. Otherwise, the terminal resumes pilot energy measurement in step 800.

According to an exemplary embodiment of the present invention, before performing an idle handoff, the terminal determines whether to perform a handoff using a list of previous active sets prior to the current active set, i.e., an active set list of BSs, in order to prevent an unnecessary handoff at a cell boundary and perform a necessary handoff. More specifically, when the pilot energy of an active set immediately previous to the current active set is greater by at least 3 dB than that of the current active set, a handoff for the neighbor set is likely to be an unnecessary handoff of the cell boundary. In order to prevent the unnecessary handoff, one handoff condition is further checked.

More specifically, in step 820, the terminal checks the active set list to determine whether the Pseudo Noise (PN) offset of a BS of the neighbor set to which an idle handoff is to be made is equal to the PN offset of a BS included in the active set list. The PN offset is set different for each BS and the terminal can perform pilot energy measurement for each BS using the PN offset. Because a maximum of three sectors generally overlap for one PN, the number of BSs included in the active set list used for the check may be limited to two.

When the PN offset of a BS of the neighbor set to which an idle handoff is to be made is equal to the PN offset of a BS included in the active set list, the terminal calculates a difference between the last time at which the BS included in the active set list functions as an active set prior to the current active set and the current time.

In step 830, if the difference is less than predetermined time $T_2$ that is set to prevent an unnecessary handoff, the terminal resumes pilot energy measurement without performing a handoff in step 800. On the other hand, if the difference is greater than the predetermined time $T_2$, the terminal performs a next step for an idle handoff in step 840.

According to an exemplary embodiment of the present invention, the terminal determines if the strength of a pilot signal of the active set satisfies a minimum threshold for a handoff before performing an idle handoff.

In step 840, the terminal measures the pilot energy of the current active set to increase a probability of receiving a paging message in the idle handoff situation. When the measured pilot energy is less than a threshold, the terminal determines that a normal connection cannot be made due to weak energy even if the terminal enters the traffic state. Thus, the terminal performs an idle handoff in step 870.

However, if the measured pilot energy is greater than the threshold, the terminal determines if it is in its assigned paging slot in step 850. If the terminal is not in its assigned paging slot, it performs an idle handoff in step 870.

If the terminal is in its assigned paging slot in step 850, it checks if there is a General Paging Message (GPM) to be received in step 860. If receiving a GPM_DONE message indicating there is no more paging message transmitted to the terminal in the assigned paging slot, the terminal performs an idle handoff in step 870.

However, if the terminal has not yet received the GPM_DONE message, it has to continuously check if there is a paging message to be transmitted during the assigned paging slot. Thus, the terminal resumes pilot energy measurement without performing a handoff in step 800.

Figure 9:
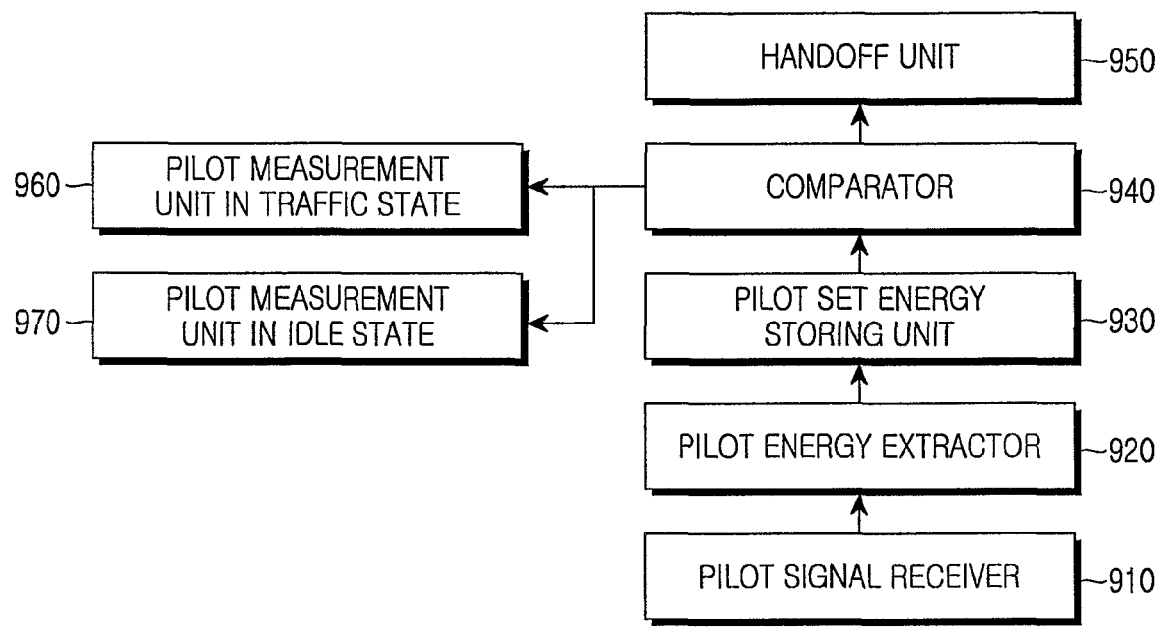
FIG. 9 is a block diagram of a terminal according to an exemplary embodiment of the present invention.

FIG. 9 is a block diagram of a terminal according to an exemplary embodiment of the present invention.

Referring to FIG. 9, a pilot signal receiver 910 receives a pilot channel of a set. A pilot energy extractor 920 measures the energy of the received pilot channel of the set. A pilot set energy storing unit 930 stores energies of sets included in a set list managed by the terminal. The newly measured energy of a pilot is stored by modifying the energy of a corresponding set in the set list stored in the pilot set energy storing unit 930. That is, the pilot set energy storing unit 930 updates the energy of the set with the newly measured energy.

A comparator 940 compares the currently measured energy of the set with the energy of the current active set to determine whether a handoff is required.

When the terminal is in the idle state, an idle pilot measurement unit 970 measures the energy of a pilot channel of a set using a pilot channel measurement pattern corresponding to the idle state i.e., performs energy measurement for a single BS of the active set and at least one (=m) BSs of the neighbor set in the order of A, $N_1$, A, $N_2$, ..., A, $N_m$, A, $N_1$, A, $N_2$, ..., A, $N_m$ .... When the terminal is in the traffic state, a pilot measurement unit 960 performs energy measurement in the order of A, $N_1$, A, $N_2$, ..., A, $N_m$, A, $N_1$, A, $N_2$, ..., A, $N_m$ ... using a pilot measurement pattern corresponding to the traffic state. More specifically, the comparator 940 determines whether to perform a handoff based on the measurement result obtained using the pilot measurement pattern determined by the pilot measurement unit 960 or 970.

When the terminal is in the idle state, the comparator 940 compares the measured energies of at least one (=m) BSs of the neighbor set with the energy of a BS of the current active set during the search rate control non-applied period and determines to perform a handoff if the comparison result satisfies a handoff condition. That is, if there is a BS with a pilot energy that is greater by at least 3 dB than that of the active set, the comparator 940 determines to perform a handoff.

The comparator 940 checks the presence of a BS having the greater pilot energy in the neighbor set by measuring the pilot energy of the single BS of the active set and the pilot energies of at least one BSs of the neighbor set, and checks if the PN offset of the BS of the neighbor set is equal to the PN offset of a BS included in the active set list.

If the PN offsets are equal to each other, the comparator 940 also calculates a difference between the last time at which the BS included in the active set list functions as an active set prior to the current active set and the current time. If the difference is greater than a threshold, the terminal determines whether the pilot energy of the active set is less than a threshold. Thereafter, a handoff unit 950 performs a handoff to the BS of the neighbor set according to the determination result.

More specifically, if the pilot energy of the active set is less than the threshold, the handoff unit 950 performs a handoff to the BS of the neighbor set. If the pilot energy of the active set is greater than the threshold, it is checked if there is a paging message to be received by the pilot signal receiver 910 and then the handoff unit 950 performs a handoff.

When the terminal is in the traffic state, the energy of the candidate set and the energy of the current active set are compared with each other. If it is determined that a handoff is required, a handoff request message is sent to a BS.

If it is determined that a handoff is required, the handoff unit 950 performs the handoff by connecting to radio resources of a BS to which the handoff is to be made.

For the terminal in the idle state, a handoff is performed if the comparator 940 determines that the handoff is required.

For the terminal in the traffic state, if the comparator 940 determines that a handoff is required, the handoff is performed only when a handoff order message is received in response to the handoff request message sent to the BS.

As described above, according to the present invention, the number of searches for BSs of a neighbor set is increased in a search rate control non-applied period and a handoff is performed only when a plurality of conditions for the handoff are satisfied. Accordingly, when a terminal moves at high speed, is in a region where several BSs overlap, or stays in a zone boundary region for a specific amount of time, the number of idle handoffs and the number of page losses can be reduced, thereby lowering a probability of failing to receive a paging message.

While the present invention has been shown and described with reference to exemplary embodiments thereof, it will be understood by those skilled in the art that various changes in form and details may be made therein without departing from the spirit and scope of the present invention.

What is claimed is:

1. A handoff method for a terminal in an idle state in a mobile communication system, the handoff method comprising:
    searching for a pilot of a single base station of an active set and a pilot of at least one base station of a neighbor set;
    determining if, among the at least one base station of the neighbor set, there is a base station having pilot energy that is greater than that of the active set;
    if there is the base station having the pilot energy that is greater than that of the active set in the neighbor set, determining if a pseudo noise offset of the base station of the neighbor set is equal to that of a base station included in an active set list including previous base stations that have been active sets;
    if the pseudo noise offsets are equal, calculating a difference between a last time at which a previous base station functions as an active set prior to a current active set and a current time; and
    if the difference is greater than a threshold time, determining if a pilot energy of the active set is less than a threshold and performing a handoff to the base station of the neighbor set.

2. The handoff method of claim 1, wherein performing the handoff to the base station of the neighbor set comprises:
    if the pilot energy of the active set is less than the threshold, performing the handoff to the base station of the neighbor set;
    if the pilot energy of the active set is greater than the threshold, determining if the terminal is in an assigned paging slot; and
    performing the handoff, if the terminal is not in the assigned paging slot, and determining if there is a paging message to be received from the active set and performing the handoff, if the terminal is in the assigned paging slot.

3. The handoff method of claim 1, further comprising variably controlling a time required to search for the at least one base station of the neighbor set by searching for the pilot of the single base station of the active set and the at least one base station of the neighbor set, in turns, one by one.

4. The handoff method of claim 1, further comprising, if the pseudo noise offsets are not equal to each other, determining if the pilot energy of the active set is less than the threshold and performing the handoff to the base station of the neighbor set.

5. The handoff method of claim 1, further comprising, if there is no base station having the greater pilot energy than that of the active set, determining that the handoff is not necessary and returning to the searching for the base station of the active set.

6. The handoff method of claim 1, further comprising, if the difference is less than the threshold time, determining that the handoff is not necessary and returning to the searching for the base station of the active set.

7. A handoff method for a terminal, comprising:
    determining if a channel assignment message is received from a base station to check a connection state; and
    measuring a pilot energy of a single base station of an active set and pilot energies of a plurality of base stations of a neighbor set that are each distinct from the single base station of the active set using a first pilot measurement pattern by measuring the pilot energy of the plurality of base stations of the neighbor set at a same search rate as that of the active set when the connection state is a traffic state, and a second pilot measurement pattern by measuring the pilot energy of the single base station of the active set and pilot energies of at least three base stations of the neighbor set at a greater search rate than that of the active set when the connection state is an idle state.

8. The handoff method of claim 7, further comprising:
    performing an idle handoff to a base station of the neighbor set, if the measured pilot energy of the base station of the neighbor set is greater by at least 3 dB than that of the single base station of the active set.

9. The handoff method of claim 7, wherein measuring the pilot energy of the single base station of the active set and the pilot energy of each of the plurality of base stations of the neighbor set comprises measuring the pilot energy of a same number of base stations of the neighbor set as a number of base stations of the active set, if the connection state is the traffic state.

10. A terminal that performs a handoff in a mobile communication system, the terminal comprising:
    a pilot energy extractor for measuring energy of a received pilot channel;
    a storing unit for storing the measured pilot energy separately for an active set and a neighbor set;
    a comparator for reading pilot energies of the active set and the neighbor set from the storing unit and comparing the read pilot energies using a first pilot measurement pattern by measuring the pilot energy of the plurality of base stations of the neighbor set at a same search rate as that of the active set when a connection state is a traffic state, and a
    second pilot measurement pattern by measuring the pilot energy of the single base station of the active set and pilot energies of at least three base stations of the neighbor set at a greater search rate than that of the active set when the connection state is an idle state; and
    a handoff unit for determining whether to perform a handoff according to a comparison result.

11. The terminal of claim 10, further comprising: at least one pilot measurement unit for checking the connection state of the terminal and measuring a pilot energy of a base station of the active set and a pilot energy of at least one base station of the neighbor set using different pilot measurement patterns according to a checked connection state.

12. The terminal of claim 10, further comprising: a traffic pilot
    measurement unit for recognizing that the connection state is the traffic state and measuring
    the pilot energy of the base station of the active set and the pilot energy of a same number of
    base stations of the neighbor set as a number of base stations of the active set.

13. The terminal of claim 10, further comprising: an idle pilot
measurement unit for recognizing that the connection state is a the idle state and measuring
the pilot energies of the base stations of the neighbor set, a number of base stations being at least
three times a number of base stations of the active set.

14. The terminal of claim 10, wherein the storing unit stores the measured pilot energy separately for the active set and the neighbor set using a pseudo noise offset of the received pilot channel.

15. The terminal of claim 13, wherein the terminal:
checks if, among base stations of the neighbor set, there is a base station having a pilot energy that is greater than that of the active set, using the comparator;
if there is the base station having the pilot energy that is greater than that of the active set in the neighbor set, determines if a pseudo noise offset of the base station of the neighbor set is equal to that of a base station included in an active set list containing previous base stations that have been active sets, using the comparator;
if the pseudo noise offsets are equal, calculates a difference between a last time at which a previous base station functions as an active set prior to the current active set and a current time, using the comparator; and
if the difference is greater than a threshold time, checks if the pilot energy of the active set is less than a threshold using the comparator and performs a handoff to the base station of the neighbor using the handoff unit.

16. The terminal of claim 15, wherein if the comparator determines that the pilot energy of the active set is less than a threshold, the terminal performs the handoff to the base station of the neighbor set, using the handoff unit.

17. The terminal of claim 16, wherein if the comparator determines that the pilot energy of the active set is greater than the threshold, the terminal determines if it is in an assigned paging slot and, if not, performs the handoff using the handoff unit.

18. The terminal of claim 17, wherein if the comparator determines that the pilot energy of the active set is greater than the threshold and the terminal determines that it is in the assigned paging slot, the terminal determines if there is a paging message to be received from the active set and performs the handoff using the handoff unit.

19. An apparatus that performs a handoff in a mobile communication system, the apparatus comprising:
means for determining if a channel assignment message is received from a base station to check a connection state; and
means for measuring a pilot energy of a single base station of an active set and a pilot energy of at least one base station of a neighbor set using a first pilot measurement pattern by means for measuring the pilot energy of a plurality of base stations of the neighbor set at a same search rate as that of the active set when the connection state is a traffic state, and a second pilot measurement pattern by means for measuring the pilot energy of the single base station of the active set and pilot energies of at least three base stations of the neighbor set at a greater search rate than that of the active set when the connection is an idle state.

20. The apparatus of claim 19, further comprising:
means for performing an idle handoff to a base station of the neighbor set, if the measured pilot energy of the base station of the neighbor set is greater by at least 3 dB than that of the base station of the active set.

21. The apparatus of claim 19, wherein the means for measuring the pilot energy of the single base station of the active set and the pilot energy of the
at least one base station of the neighbor comprises means for measuring the pilot energy of a
same number of base stations of the neighbor set as a number of base stations of the active set, if
the connection state is the traffic state.

22. The apparatus of claim 19, wherein the means for measuring the pilot energy of the single base station of the active set and the pilot energy of the
at least one base station of the neighbor comprises means for measuring the pilot energy of the at
least one base station of the neighbor set at a greater search rate than that of the active set, if the
connection state is the idle state.

23. A non-transitory machine readable medium embodying instructions that, when executed by a processor, allow the processor to perform a handoff method
in a mobile communication system, the method comprising:
measuring energy of a received pilot channel;
storing the measured pilot energy separately for an active set and a neighbor set;
reading pilot energies of the active set and the neighbor set and comparing the read pilot energies using a first pilot measurement pattern by measuring the pilot energy of a plurality of base stations of the neighbor set at a same search rate as that of the active set when the connection state is a traffic state, and a second pilot measurement pattern by measuring the pilot energy of the single base station of the active set and pilot energies of at least three base stations of the neighbor set at a greater search rate than that of the active set when the connection state is an idle state; and
determining whether to perform a handoff according to the comparison result.

24. The machine readable medium of claim 23, wherein the method further comprises:
checking the connection state and measuring a pilot energy of a base station of the active set and a pilot energy of at least one base station of the neighbor set using different pilot measurement patterns according to a checked connection state.

25. The machine readable medium of claim 23, wherein storing the measured pilot energy separately for an active set and a neighbor set further comprises storing the measured pilot energy separately for the active set and the neighbor set using a pseudo noise offset of the received pilot channel.

26. The machine readable medium of claim 23, wherein the method further comprises:
checking if, among base stations of the neighbor set, there is a base station having a pilot energy that is greater than that of the active set;
if there is the base station having the pilot energy that is greater than that of the active set in the neighbor set, determining if a pseudo noise offset of the base station of the neighbor set is equal to that of a base station included in an active set list containing previous base stations that have been active sets;
if the pseudo noise offsets are equal, calculating a difference between a last time at which a previous base station functions as an active set prior to the current active set and a current time; and if the difference is greater than a threshold time, checking if the pilot energy of the active set is less than a threshold and performing a handoff to the base station of the neighbor.

27. The machine readable medium of claim 26, wherein the method further comprises:
if the pilot energy of the active set is determined to be less than the threshold, performing the handoff to the base station of the neighbor set.

28. The machine readable medium of claim 27, wherein the method further comprises:
if the pilot energy of the active set is determined to be greater than the threshold, determining whether the processor is in an assigned paging slot and, if not, performing the handoff.

29. The machine readable medium of claim 28, wherein the method further comprises:
if the pilot energy of the active set is determined to be greater than the threshold and the processor is determined to be in the assigned paging slot, determining if there is a paging message to be received from the active set and performing the handoff.

\* \* \* \* \*